US009665534B2

(12) United States Patent
Tsirkin

(10) Patent No.: US 9,665,534 B2
(45) Date of Patent: May 30, 2017

(54) MEMORY DEDUPLICATION SUPPORT FOR REMOTE DIRECT MEMORY ACCESS (RDMA)

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 14/723,033

(22) Filed: May 27, 2015

(65) Prior Publication Data
US 2016/0350261 A1 Dec. 1, 2016

(51) Int. Cl.
*G06F 15/173* (2006.01)
*G06F 12/14* (2006.01)

(52) U.S. Cl.
CPC ...... *G06F 15/17331* (2013.01); *G06F 12/145* (2013.01); *G06F 2212/1052* (2013.01)

(58) Field of Classification Search
CPC ............. G06F 15/17337; G06F 12/145; G06F 2212/1052
See application file for complete search history.

(56) References Cited

U.S. PATENT DOCUMENTS

| | | | |
|---|---|---|---|
| 8,407,428 B2 | 3/2013 | Cheriton et al. | |
| 8,504,791 B2 | 8/2013 | Cheriton et al. | |
| 8,990,171 B2* | 3/2015 | Kalach | G06F 17/30159 707/664 |
| 9,116,803 B1* | 8/2015 | Agrawal | G06F 11/0751 |
| 2004/0024833 A1* | 2/2004 | Siddabathuni | G06F 13/28 709/212 |
| 2006/0045099 A1* | 3/2006 | Chang | H04L 69/166 370/400 |
| 2006/0059242 A1* | 3/2006 | Blackmore | G06F 12/1081 709/211 |
| 2011/0055471 A1 | 3/2011 | Thatcher et al. | |
| 2012/0124282 A1 | 5/2012 | Frank et al. | |
| 2013/0054524 A1* | 2/2013 | Anglin | G06F 17/30575 707/624 |
| 2014/0196037 A1* | 7/2014 | Gopalan | G06F 9/4856 718/1 |
| 2014/0201451 A1* | 7/2014 | Dube | G06F 12/084 711/130 |

(Continued)

OTHER PUBLICATIONS

Murray, Derek G., H. Steven, and Michael A. Fetterman. "Satori: Enlightened page sharing." In Proceedings of the USENIX Annual Technical Conference. 2009.*

(Continued)

*Primary Examiner* — David X Yi
*Assistant Examiner* — Ramon A Mercado
(74) *Attorney, Agent, or Firm* — Haynes and Boone, LLP

(57) ABSTRACT

An example method of providing deduplication support for remote direct memory access (RDMA) memory includes detecting that a first memory page and a second memory page are identical. A first mapping maps a first virtual memory address (VMA) to a first physical memory address (PMA) of the first memory page. A second mapping maps a second VMA to a second PMA of the second memory page. An RDMA memory region includes the first memory page. The method also includes updating the first mapping to map from the first VMA to the second PMA. The method further includes re-registering the RDMA memory region for RDMA.

20 Claims, 8 Drawing Sheets

(56) References Cited

U.S. PATENT DOCUMENTS

2014/0280382 A1    9/2014  Gabay et al.
2015/0234669 A1*  8/2015  Ben-Yehuda ......... G06F 3/0604
                                                                                            718/1
2015/0324236 A1*  11/2015  Gopalan ............... G06F 9/5027
                                                                                          711/162

OTHER PUBLICATIONS

Michael S. Tsirkin, Re: [Qemu-Devel] [Patch] RDMA: don't Make Pages Writeable if Not Requiested, Mar. 21, 2013, 4 pages ; retrieved from http://lists.gnu.org/archive/html/qemu-devel/2013-03/msg03665.html May 27, 2015.

Kuniyasu Suzaki, Kengo Iijima, Toshiki Yagi, Cyrille Artho; Memory Deduplication as a Threat to the Guest OS, 2011, 6 pages, National Institute of Advanced Industrial Science and Technology, retrieved from https://staff.aist.go.jp/c.artho/papers/EuroSec2011-suzaki.pdf on May 27, 2015.

Benoit Hudzia; Memory Aggregation for KVM, Nov. 2012, 41 pages, Sr. Researcher; SAP Research Belfast; retrieved from http://www.linux-kvm.org/wiki/images/2/29/2012-forum-Hecatonchire_Benoit_Hudzia.pdf on May 27, 2015.

* cited by examiner

MEMORY DEDUPLICATION SUPPORT FOR REMOTE DIRECT MEMORY ACCESS (RDMA)

FIELD OF DISCLOSURE

The present disclosure generally relates to memory management, and more particularly to providing deduplication support for remote direct memory access (RDMA).

BACKGROUND

Memory deduplication analyzes patterns of information by segmenting a dataset into, for example, variable length blocks and searching for recurring blocks. All identical successive blocks are replaced with a pointer to the respective initial detected block instead of storing the block again. When reading the file, the pointer series ensures that all the blocks are accessed in the exact order. Memory deduplication improves memory utilization by detecting that two (or more) pages in memory have identical content.

RDMA typically allows a computer system to directly read or modify the memory of another computer system using "zero-copy," which refers to a memory allocation technique that provides computer systems with the ability to directly write data to and read data from remote memory and allows applications that implement RDMA to access remote buffers directly without the need to copy it between different software layers. An RDMA-enabled network interface adapter establishes connections to transfer the data directly between specified buffers in the user-space memory. Accordingly, this zero-copy approach is much more efficient than requiring multiple data transfers on each side of the network.

Unfortunately, if an application registers memory for RDMA, memory deduplication is disabled, even if the registration is for read access only. In this case, memory is not overcommitted.

BRIEF SUMMARY

It may be desirable to provide deduplication support for RDMA memory. Methods, systems, and techniques are provided for providing deduplication support for RDMA memory.

According to an embodiment, a method of providing deduplication support for remote direct memory access (RDMA) memory includes detecting that a first memory page and a second memory page are identical. A first mapping maps a first virtual memory address (VMA) to a first physical memory address (PMA) of the first memory page. A second mapping maps a second VMA to a second PMA of the second memory page. An RDMA memory region includes the first memory page. The method also includes updating the first mapping to map from the first VMA to the second PMA. The method further includes re-registering the RDMA memory region for RDMA.

According to another embodiment, a system for providing deduplication support for RDMA memory includes an RDMA memory region that includes a first memory page. The system also includes a same page managing module that detects that the first memory page and a second memory page are identical. A first mapping maps a first VMA to a first PMA of the first memory page. A second mapping maps a second VMA to a second PMA of the second memory page. An RDMA memory region includes the first memory page. The system further includes a deduplication module that updates the first mapping to map from the first VMA to the second PMA. The system also includes an RDMA core that re-registers the RDMA memory region for RDMA.

According to another embodiment, a non-transitory machine-readable medium includes a plurality of machine-readable instructions that when executed by one or more processors are adapted to cause the one or more processors to perform a method including: detecting that a first memory page and a second memory page are identical, where a first mapping maps a first VMA to a first PMA of the first memory page, and a second mapping maps a second VMA to a second PMA of the second memory page, and where an RDMA memory region includes the first memory page; updating the first mapping to map from the first VMA to the second PMA; and re-registering the RDMA memory region for RDMA.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
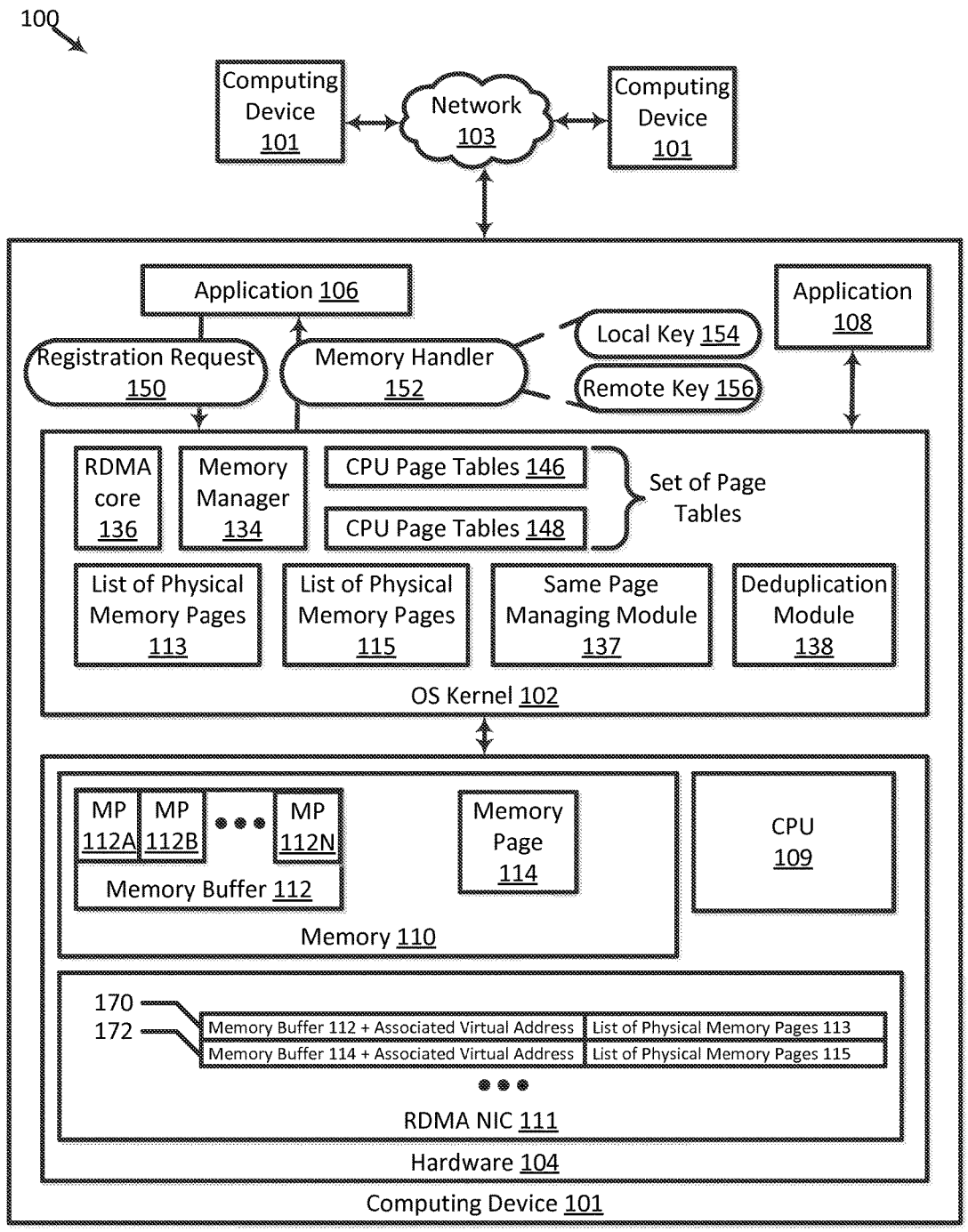
FIG. 1 depicts a system of one illustrative embodiment of one or more computing devices in accordance with one or more aspects of the present disclosure.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
   A. Memory for RDMA Registration
   B. Example CPU Page Tables
III. Example Process Flow
   A. Determine Whether to De-duplicate a Memory Page
   B. De-duplicate the Memory Page
IV. Example Host Computer System
V. Example Method
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Remote Direct Memory Access (RDMA) typically allows a computer system to directly read or modify the memory of another computer system using "zero-copy," which refers to a memory allocation technique that provides computer systems with the ability to directly write data to and read data from remote memory and allows applications that implement RDMA to access remote buffers directly without the need to copy it between different software layers. Features such as zero-copy and RDMA help reduce processor overhead by directly transferring data from sender memory to receiver memory without involving host processors. Using conventional techniques, memory deduplication is disabled for RDMA memory. For example, if an application registers memory for RDMA, memory deduplication is disabled. The present disclosure provides techniques for memory deduplication support for RDMA.

Memory deduplication improves memory utilization by detecting that two (or more) pages in memory are identical and merging the duplicate pair of pages into a single page. In an example, a first memory page may reside in a first application's memory space, and a second memory page may reside in a second application's memory space. If the first and second memory pages have the same content, the first memory page may be considered a duplicate of the second memory page and removed. In such an example, the page table of the first application may be modified to point to the second memory page, and the first application may use the second memory page rather than the first memory page, thus improving the utilization of memory.

Described herein are methods and systems for providing deduplication support for memory registered as RDMA memory. In some embodiments, a method of providing deduplication support for remote direct memory access (RDMA) memory includes detecting that a first memory page and a second memory page are identical. A first mapping maps a first virtual memory address (VMA) to a first physical memory address (PMA) of the first memory page. A second mapping maps a second VMA to a second PMA of the second memory page. An RDMA memory region includes the first memory page. The method also includes updating the first mapping to map from the first VMA to the second PMA. The method further includes re-registering the RDMA memory region for RDMA.

Unless specifically stated otherwise, as apparent from the following discussion, it is appreciated that throughout the description, discussions utilizing terms such as "determining," "protecting," "sending," "receiving," "detecting," "updating," "replacing," "registering," "setting," "re-registering," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 depicts a system 100 of one illustrative embodiment of one or more computing devices 101 in accordance with one or more aspects of the present disclosure. Computing devices 101 may be coupled over a network 103. Network 103 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Computing device 101 includes an OS kernel 102 that serves as an intermediary layer between hardware 104 and the software (e.g., applications 106 and 108). In an example, OS kernel 102 is a LINUX® kernel. Trademarks are the property of their respective owners. Hardware 104 includes one or more CPUs 109, memory 110, and an RDMA network interface card (NIC) 111. "Memory" herein shall refer to volatile or non-volatile memory, such as random access memory (RAM), read-only memory (ROM), electrically erasable ROM (EEPROM), or any other memory capable of storing data.

A "CPU" may also be referred to as a "physical processor" or "processor" herein. A CPU shall refer to a device capable of executing instructions encoding arithmetic, logical, or I/O operations. In one illustrative example, a CPU may follow the Von Neumann architectural model and may include an arithmetic logic unit (ALU), a control unit, and a plurality of registers. In a further aspect, a CPU may be a single core CPU that is typically capable of executing one instruction at a time (or process a single pipeline of instructions), or a multi-core CPU that may simultaneously execute multiple instructions. In another aspect, a CPU may be implemented as a single integrated circuit, two or more integrated circuits, or may be a component of a multi-chip module (e.g., in which individual microprocessor dies are included in a single integrated circuit package and hence share a single socket).

OS kernel 102 manages resources of computing device 101 when one or more applications are running on computing device 101. In an example, OS kernel 102 may share available resources (e.g., CPU time, disk space, and network connections) between various system processes while at the same time ensuring system integrity. OS kernel 102 may use a memory management technique called virtual memory, which maps virtual addresses used by an application into physical addresses in memory. In a virtual memory system, the addresses seen by user programs do not directly correspond to the physical addresses used by the hardware. A central processing unit (CPU) may include a memory management unit (MMU) (not shown) that supports the use of virtual memory. With MMU, memory addresses may go through a translation step from a virtual address to a physical address prior to each memory access. Memory 110 may include random access memory (RAM), and a MMU may divide the RAM into pages. A page is a contiguous section of memory of a set size that is handled by the MMU. In an example, each page is four kilobytes (KB).

OS kernel 102 includes a memory manager 134, RDMA core 136, same page managing module 137, and deduplication module 138. Memory manager 134 maintains pages tables for each application running in computing device 101. Computing device 101 includes an application (e.g., application 106 and/or application 108) that may register memory for RDMA. Memory manager 134 may manage a set of CPU page tables 146 and 148 for application 106 and application 108, respectively.

The set of CPU page tables is stored in memory, and each stored entry of a CPU page table is called a page table entry. A CPU page table may also be referred to as a page table. CPU page table 146 may be application 106's page tables, and CPU page tables 148 may be application 108's page tables. CPU 109 uses a CPU page table to translate VMAs to PMAs. In an example, each entry in a CPU page table maps a location in an application's virtual memory space to a location in the physical memory space. In an example, address translation transforms addresses in application 106's virtual address space to locations in physical memory (e.g., memory 110). The page table entry for a virtual page has permission bits that specify what a user space process can and cannot do with a particular page. The permission bits may specify whether a user space process may perform read, write, and/or execute (execution permission indicates that page binary data may be executed as machine code in the same way as programs are executed) operations on the page.

A. Memory for RDMA Registration

RDMA core 136 may implement RDMA within computing device 101 by registering a memory region as RDMA memory, which shall refer to memory that is directly accessible by another computing device using "zero-copy" techniques. An RDMA device may refer to any component that accesses or uses memory that has been registered as RDMA memory. Each memory region accessed by an RDMA device is registered with RDMA core 136 by sending a registration request to RDMA core 136. In the example illustrated in FIG. 1, application 106 sends a registration request 150 to RDMA core 136. Registration request 150 may be a request to register a memory region. For brevity, application 106 will be described as registering a memory region. It should also be understood that any application (e.g., application 108) may register memory for RDMA using these techniques.

OS kernel 102 may expose an application programming interface (API), which allows programs in user space to access system resources and services of OS kernel 102. In an embodiment, RDMA core 136 exposes a registration API, and application 106 invokes the registration API via registration request 150 to register a memory region for RDMA. As part of registration request 150, application 106 may also specify whether RDMA hardware has read or write access to the memory region. Accordingly, application 106 will know whether RDMA hardware may modify the memory region or always read from the memory region. These permissions to access the memory region are saved in RDMA NIC 111. In an example, application 106 may specify that RDMA hardware has write, write-only, read, read-only, and/or execute permissions for the memory region. RDMA core 136 may check the permissions of the memory region to ensure that the requested permissions for the memory region is supported by them.

Responsive to registration request 150, RDMA core 136 retrieves a memory buffer 112 from application 106's memory space and registers the memory buffer as RDMA memory. RDMA core 136 may partition the contiguous memory region into a set of physical memory pages 112A, 112B, . . . , and 112N, and provide a mapping of the virtual-to-physical address translation. Memory buffer 112 is composed of memory pages 112A, 112B, . . . , and 112N. Each of these memory pages may be associated with a VMA that maps to a PMA of the respective memory page in memory 110.

In some examples, for each of the memory pages of which memory buffer 112 is composed, RDMA core 136 stores a mapping from the memory page to memory buffer 112 into RDMA NIC 111. Additionally, RDMA core 136 may also store a mapping from memory buffer 112 to a list of physical memory pages 113 into RDMA NIC 111. List of physical memory pages 113 specifies the memory pages of which memory buffer 112 is composed. RDMA core 136 stores list of physical memory pages 113 in memory. Memory buffer 112 is composed of the memory pages listed in list of physical memory pages 113. In the example illustrated in FIG. 1, list of physical memory pages 113 specifies memory pages 112A, 112B, . . . , and 112N. RDMA core 136 may also check the permissions of memory buffer 112 to ensure that the requested permissions for the memory buffer are supported by them.

During registration of memory buffer 112, RDMA core 136 pins the memory pages of memory buffer 112 to prevent them from being swapped out. This keeps the virtual-to-physical mapping unchanged. For each memory page of which memory buffer 112 is composed, RDMA core 136 may set a flag associated with the memory page. In an example, the flag is an indication to notify deduplication module 138 that the particular memory page is to be de-duplicated. A first memory page that is associated with an application's memory space is de-duplicated if the first memory page is removed and the application uses a second memory page that has identical contents of the first memory page. The flag may be in operating system memory maintained by memory manager 134. In an example, most pages in memory are not registered for RDMA, so the flag may be set for those pages that are registered for RDMA in order to speed up the lookup for these RDMA pages.

After a successful memory registration is completed, RDMA core 136 may return a memory handler 152 associated with memory buffer 112 to application 106. In some examples, every registered memory handler has two keys, one for local access and one for remote access. Those keys will be used when specifying those memory buffers in work requests. In an example, memory handler 152 includes a local key 154 and a remote key 156. Local key 154 is a key that is used by application 106 for accessing memory buffer 112 (e.g., for local work requests). Remote key 156 is a key that is used by another application for accessing memory buffer 112 using RDMA operations. Memory handler 152 may be a pointer to the virtual address space that, from application 106's point of view, references list of physical memory pages 113.

Application 106 may use memory handler 152 in work requests when referring to memory buffer 112, and memory manager 134 may translate the VMA associated with memory handler 152 into the appropriate PMA in order to access the requested data. For example, application 106 may provide memory handler 152 (e.g., local key 154) to the RDMA hardware (e.g., memory 104) for access to memory buffer 112. In this example, memory manager 134 may translate the VMA referenced by memory handler 152 to a PMA in hardware in order to determine the correct PMA at which the requested data is stored.

After a successful memory registration is completed, the RDMA hardware in system 100 has direct access to the memory pages of memory buffer 112. Memory buffer 112 is usable for RDMA and may be referred to as RDMA memory. Additionally, a memory page that has been registered with RDMA core 136 may be referred to as an RDMA memory page. Application 106 may write into memory buffer 112 residing on node 102, and the data written into memory buffer 112 may be directly transferred from memory buffer 112 to, for example, another memory residing on a remote computing device coupled to computing device 101 over a network, without involving CPU(s) 108.

Memory 110 also includes a memory page 114. Memory page 114 may be associated with application 108 and be in application 108's memory space. RDMA network interface card (RNIC) 111 may implement a transport protocol in computing device 101. RNIC 111 maintains internal mappings from a "memory region+its associated virtual address" pair to its associated list of physical memory pages. For example, RNIC 111 stores a mapping 170 from the "memory buffer 112+its associated virtual addresses in application 106's memory space" pair to list of physical memory pages 113, and a mapping 172 from the "memory buffer 114+its associated virtual addresses in application 108's memory space" pair to list of physical memory pages 115.

B. Example CPU Page Tables

Figure 2A:
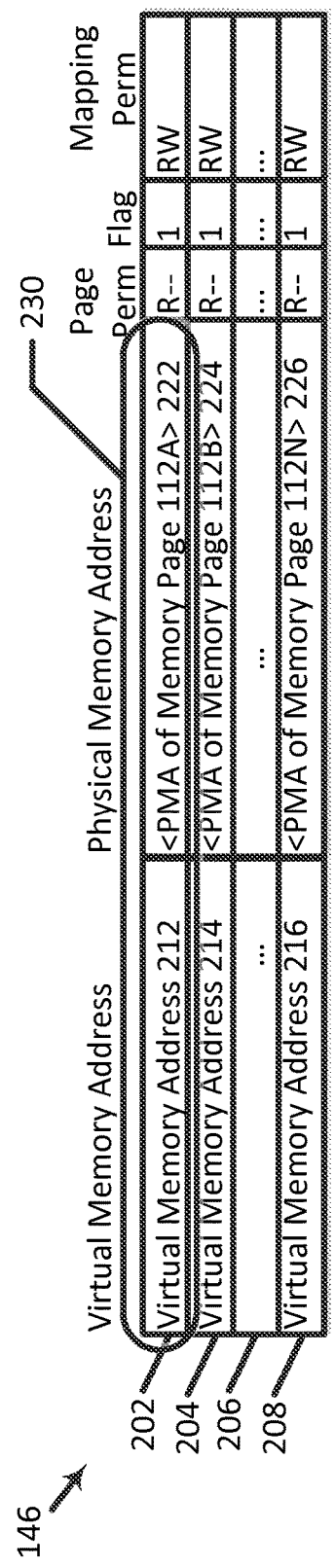
FIGS. 2A and 2B illustrate CPU pages tables in accordance with one or more aspects of the present disclosure.
Figure 2B:
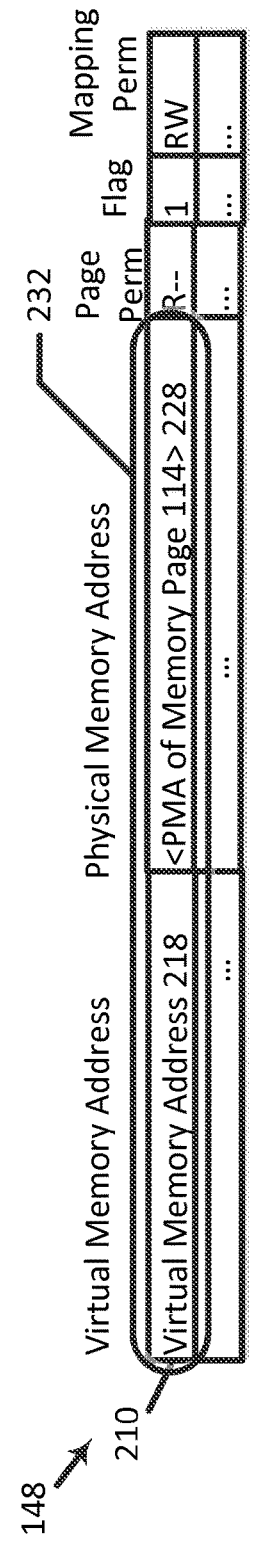

FIGS. 2A and 2B illustrate CPU pages tables in accordance with one or more aspects of the present disclosure. In the example illustrated in FIG. 2A, CPU page tables 146 include four entries 202, 204, 206 and 208. Although CPU page tables may be implemented in a tree-like structure, for simplicity CPU page tables 146 in FIG. 2A show a flattened view of a mapping from a VMA to a PMA. Each of the CPU page table entries corresponds to a page in application 106's virtual memory space, a virtual-to-physical memory address translation of the page, a flag, and mapping permissions. CPU 109 uses CPU page tables 146 to translate a VMA in application 106's virtual memory space to a PMA, which is the PMA at which the particular memory page resides in memory 110. In an example, CPU 109 uses entry 202 to translate VMA 212 to PMA 222 of memory page 112A. The flag is set such that deduplication module 138 sends a notification to RDMA core 136 if memory page 112A is de-duplicated, and a mapping permission of the mapping from VMA 212 to PMA 222 is set to a read-write permission.

In the example illustrated in FIG. 2B, CPU page tables 148 include an entry 210. Although CPU page tables may be implemented in a tree-like structure, for simplicity CPU page tables 148 in FIG. 2B show a flattened view of a mapping from a VMA to a PMA. Each of the CPU page table entries corresponds to a page in application 108's virtual memory space, a virtual-to-physical memory address translation of the page, a flag, and mapping permissions. CPU 109 uses CPU page tables 148 to translate a VMA in application 108's virtual memory space to a PMA, which is the PMA at which the particular memory page resides in memory 110. In an example, CPU 109 uses entry 210 to translate VMA 218 to PMA 228 of memory page 114. The flag is set such that deduplication module 138 sends a notification to RDMA core 136 if memory page 114 is de-duplicated, and a mapping permission of the mapping from VMA 218 to PMA 228 is set to a read-write permission.

III. Example Process Flow

A. Determine Whether to De-Duplicate a Memory Page

Figure 3A:
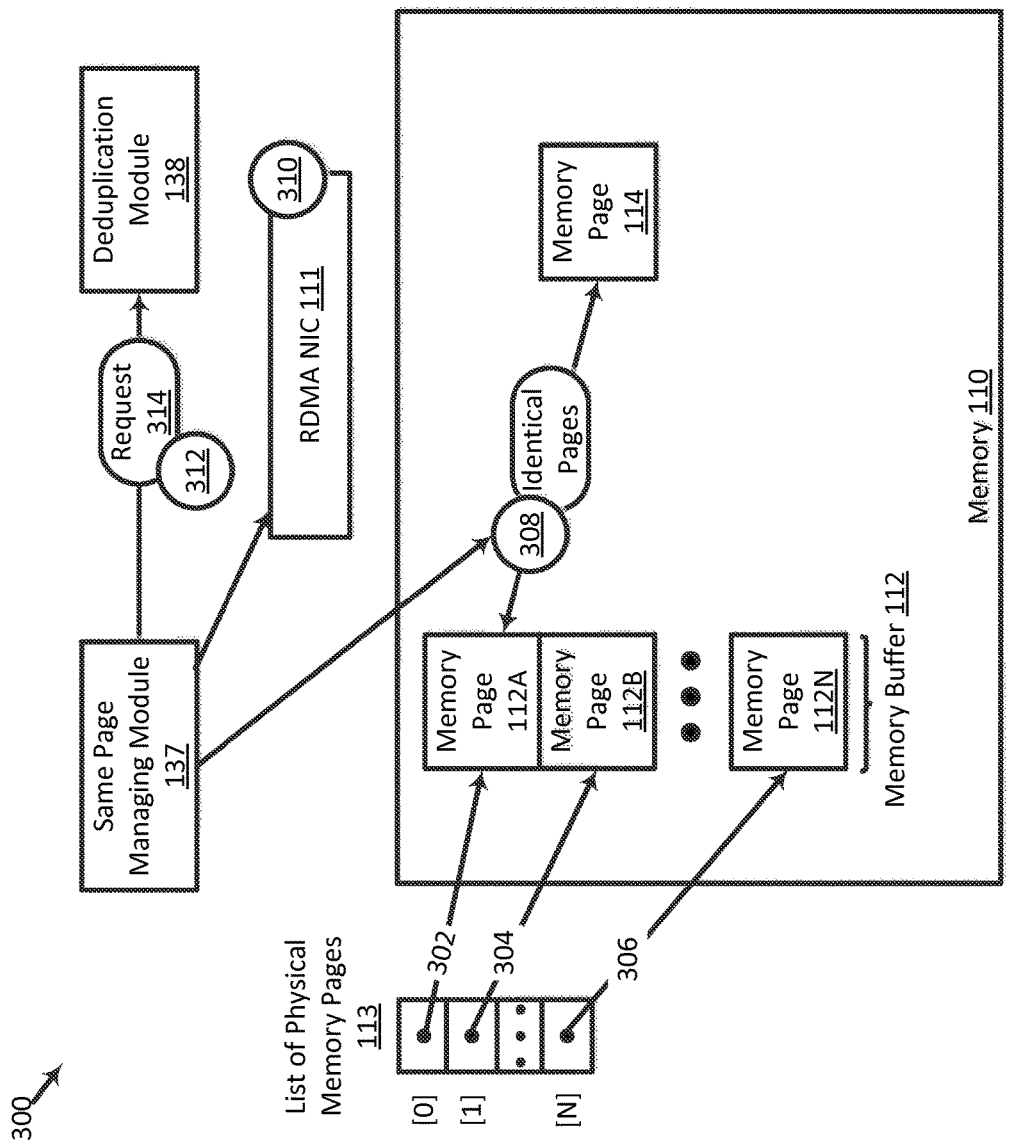
FIGS. 3A-3C illustrate a process flow for providing deduplication support for RDMA memory in accordance with one or more aspects of the present disclosure.
Figure 3B:
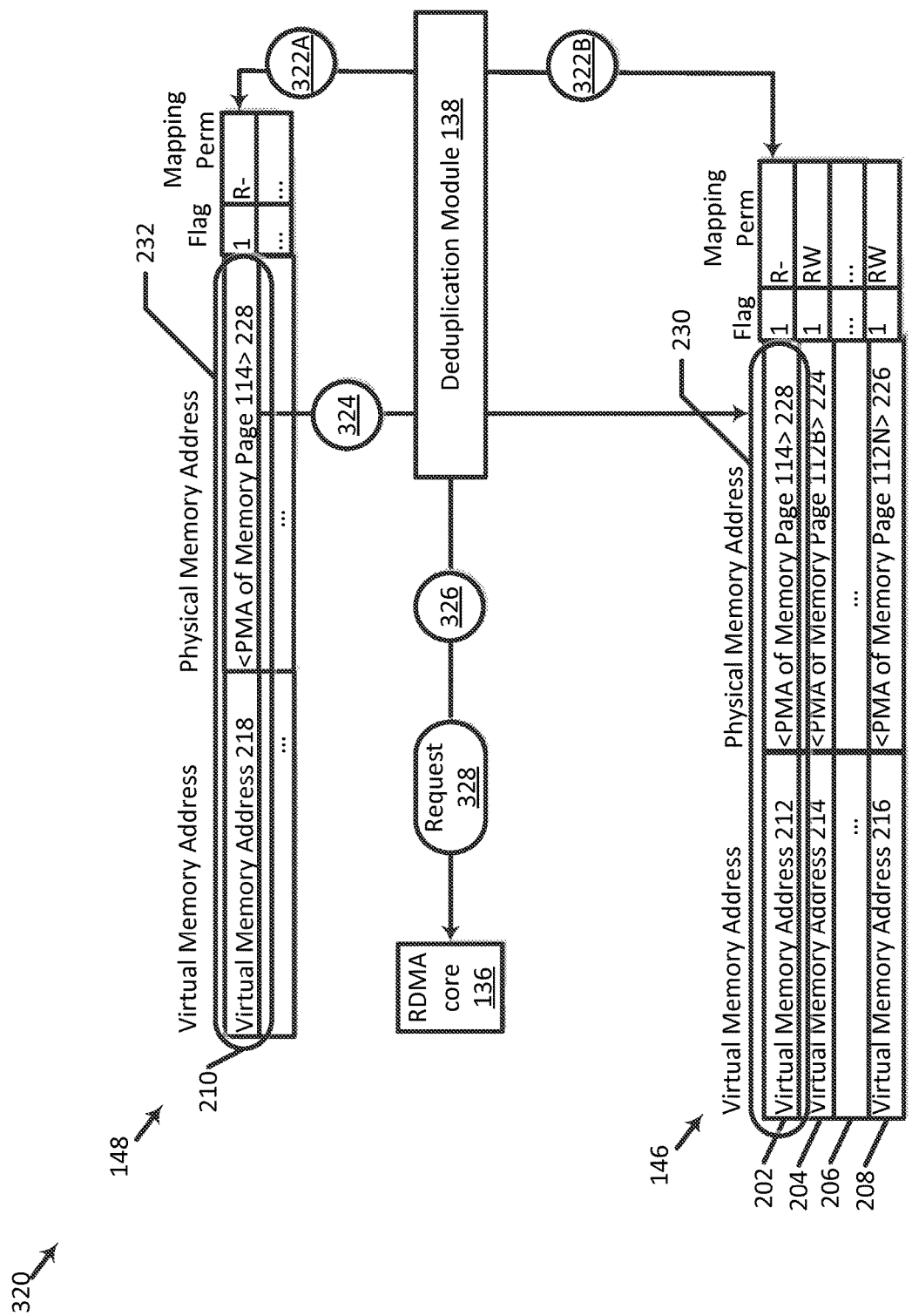
Figure 3C:
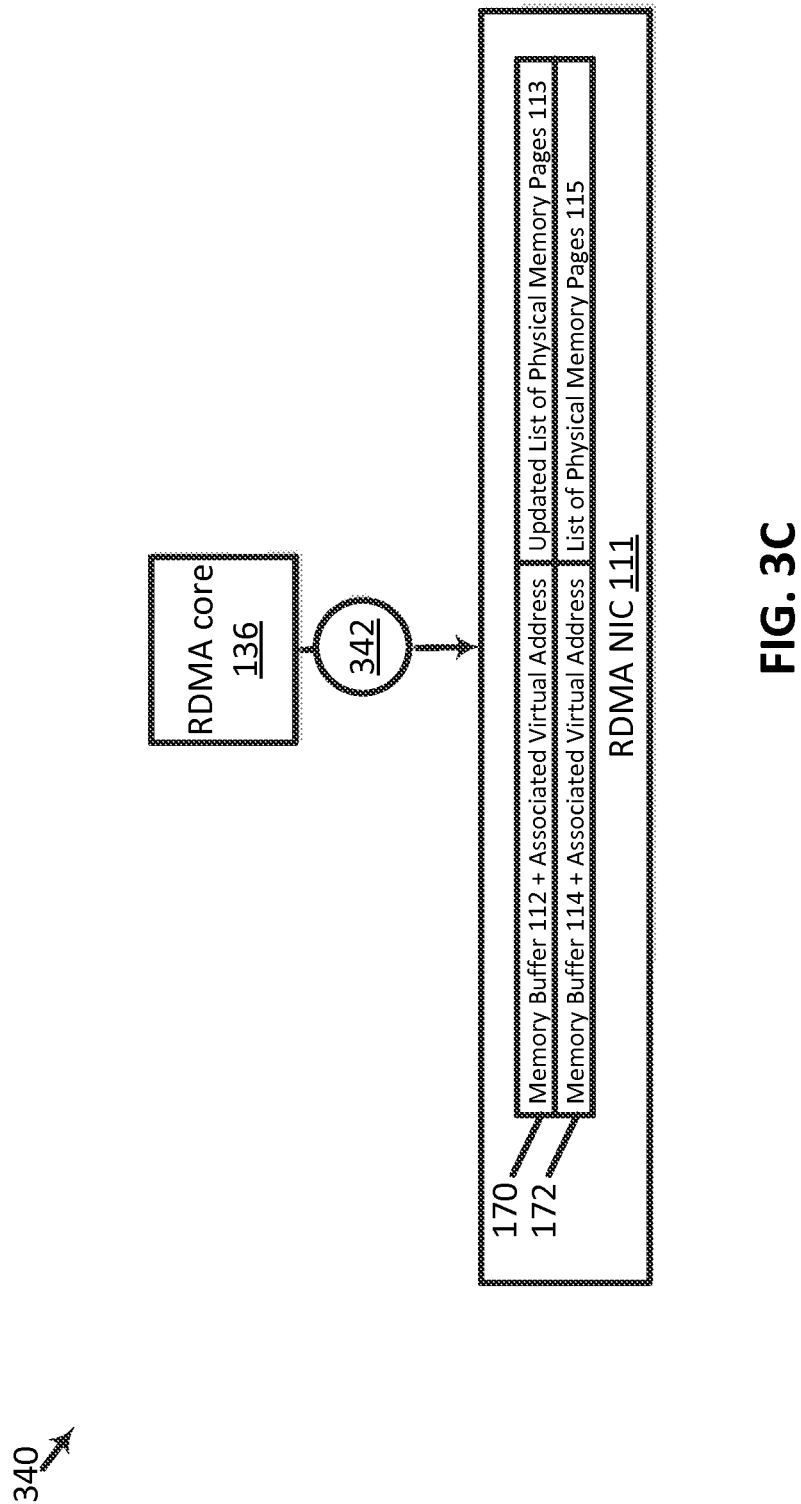

The present disclosure provides for techniques that provide deduplication support for memory that has been registered for RDMA. FIGS. 3A-3C illustrate a process flow 300, 320, 340 for providing deduplication support for RDMA memory in accordance with one or more aspects of the present disclosure. In the example illustrated in FIG. 3A, list of physical memory pages 113 is an array including pointers that reference each of the memory pages included in memory buffer 112. Memory buffer 112 includes memory pages 112A, 112B, . . . , 112N, and OS kernel 102 maintains list of physical memory pages 113, which specifies memory pages 112A, 112B, . . . , and 112N. Index [0] of list of physical memory pages 113 stores a reference 302 to memory page 112A, index [1] of list of physical memory pages 113 stores a reference 304 to memory page 112B, . . . , and index [N] of list of physical memory pages 113 stores a reference 306 to memory page 112N.

Same page managing module 137 may maintain active memory pages in memory 110 in a tree structure and detect when two or more memory pages in the tree are identical. In keeping with the above example, memory buffer 112 is associated with application 106 and is in application 106's memory space, and memory page 114 is associated with application 108 and is in application 108's memory space. At an action 308, same page managing module 137 may detect that RDMA memory page 112A, which is associated with application 106's memory space, and memory page 114, which is associated with application 108's memory space, are identical. Two memory pages are identical if the content stored at those pages is the same.

In an example, memory page 114 is not registered for RDMA. In another example, a memory buffer in memory 110 includes memory page 114 and is registered for RDMA. In order to de-duplicate memory page 112A, this memory buffer that resides in application 108's memory space should be in the read-only permission. Same page managing module 137 may determine that RDMA memory page 112A is a duplicate of memory page 114. In an example, same page managing module 137 may determine that the last-created memory page is the duplicate. In another example, same page managing module 137 may determine that the last-written to memory page is the duplicate.

It may be desirable to de-duplicate memory page 112A to improve memory utilization and enable application 106 to use memory page 114 rather than memory page 112A. As such, memory page 112A may be unpinned and reused for other purposes, and memory page 114 may be shared between applications 106 and 108. In response to determining that RDMA memory page 112A is a duplicate of memory page 114, same page managing module 137 may determine whether to de-duplicate memory page 112A (remove memory page 112A and have application 106 use memory page 114).

At an action 310, in response to determining that RDMA memory page 112A is a duplicate of memory page 114, same page managing module 137 may determine memory buffer 112's access permissions. In an example, same page managing module 137 reads memory buffer 112's access permissions from RDMA NIC 111. If same page managing module 137 determines that RDMA hardware has permission to perform write operations on memory buffer 112, same page managing module 137 may determine that memory page 112A may not be de-duplicated. In this example, same page managing module 137 may send a message indicating that memory page 112A may not be de-duplicated to deduplication module 138. If same page managing module 137 determines that RDMA hardware has permission to only perform read operations on memory buffer 112, same page managing module 137 may determine that memory page 112A may be de-duplicated.

At an action 312, if same page managing module 137 determines that memory page 112A may be de-duplicated, same page managing module 137 sends a request 314 to deduplication module 138 to de-duplicate memory page 112A. In some examples, same page managing module 137 sends request 314 to deduplication module 138 if same page managing module 137 reads the flag associated with memory page 114 and the flag is set (e.g., has a value of one).

B. De-Duplicate the Memory Page

In some examples, the actions in FIGS. 3B and 3C are performed if same page managing module 137 determines that memory page 112A may be de-duplicated (e.g., memory buffer 112 is set to the read-only permission or is write-protected). In FIG. 2A, a first mapping 230 maps VMA 212 to PMA 222. In FIG. 2B, a second mapping 232 maps VMA 218 to PMA 228. Deduplication module 138 may determine the mapping permissions of the applicable entries associated with the identical memory pages in the CPU page tables. If an applicable mapping (a mapping that is associated with one or more of the identical memory pages) is not write-protected, deduplication module 138 may write protect the mapping. In some examples, both mappings are write protected.

Referring back to the example illustrated in FIG. 3B, at an action 322A, deduplication module 138 write protects the mapping permission of mapping 232 in entry 210 in CPU page tables 148 (the mapping from VMA 218 to PMA 228 of memory page 114). In some examples, deduplication module 138 sets the mapping permission to the read-only permission. At an action 322B, deduplication module 138 write protects the mapping permission of mapping 230 in entry 202 in CPU page tables 146. A mapping permission indicates the access permission to the associated virtual-to-physical memory address mapping. For example, a mapping permission of "RW" in an entry indicates that the mapping from the VMA to the PMA can be read and modified. A mapping permission of "R−" in an entry indicates that the mapping can only be read, but not modified. A mapping permission that is write-protected is not modifiable.

By write-protecting the mapping permission of entry 210, deduplication module 138 may protect the mapping permission associated with memory page 114 from write operations. In an example, deduplication module 138 may protect the memory mapping from write operations by setting a bit in application 108's CPU page tables 148 to indicate that no write operations are allowed on the virtual-to-physical memory address mapping associated with memory page 114. After the mapping permission has been protected from write operations, the virtual-to-physical address mapping is non-modifiable by applications or other RDMA hardware.

At an action 324, deduplication module 138 updates mapping 230 from VMA 212 to PMA 222 in entry 202 (PMA of memory page 112A as shown in FIG. 2A) to map from VMA 212 to PMA 228 (as shown in FIG. 3B), which is the PMA of memory page 114. Accordingly, mapping 230 is updated to map from VMA 212 to PMA 228. At an action 326, after the mapping of VMA 212 is updated to reference PMA 228, deduplication module 138 sends a request 328 to RDMA core 136 to re-register memory buffer 112.

In FIG. 3C, RDMA core 136 re-registers memory buffer 112 for RDMA. At this point, a first VMA residing in application 106's memory space maps to a PMA in memory 110, and a second VMA residing in application 108's memory also maps to that same PMA. In some examples, RDMA core 136 re-registers memory buffer 112 after the mapping of VMA 212 is updated to reference PMA 228.

RDMA core 136 may re-register memory buffer 112 by executing a re-register command that re-registers each of the physical memory pages to which a VMA associated with memory buffer 112 maps. As part of re-registering memory buffer 112, RDMA core 136 may update list of physical memory pages 113. In an example, deduplication module 138 updates list of physical memory pages 113 by replacing memory page 112A specified in the list with memory page 114. After the update to list of physical memory pages 113, reference 302, which initially pointed to memory page 112A in FIG. 3A, now points to memory page 114, which is associated with application 108's virtual memory space. Accordingly, list of physical memory pages 113 specifies a second set of memory pages that includes memory page 114, memory page 112B, . . . , and memory page 112N. The updated list of physical memory pages specifies memory page 114, which memory page 112A is a duplicate of, and does not specify the memory page that was de-duplicated (e.g., memory page 112A).

Additionally, before the registration of memory buffer 112, RDMA NIC 111 stores mapping 170 from the "memory buffer 112+its associated virtual addresses in application 106's memory space" pair to list of physical memory pages 113, and mapping 172 from the "memory buffer 114+its associated virtual addresses in application 108's memory space" pair to list of physical memory pages 115 (see FIG. 1). In FIG. 3C, at an action 342 as part of the re-registration process, RDMA core 136 updates mapping 170 to store a mapping from the "memory buffer 112+its associated virtual addresses in application 106's memory space" pair to the updated list of physical memory pages 113. Accordingly, after RDMA core 136 re-registers memory buffer 112, the updated list of physical memory pages 113 and RDMA NIC 111 are updated. In some examples, RDMA core 136 sends a command to RDMA NIC 111 to update mapping 170 such that it is a mapping from the "memory buffer 112+its associated virtual addresses in application 106's memory space" pair to the updated list of physical memory pages 113.

Accordingly, both RDMA NIC 111 and CPU page tables 146 specify a mapping from VMA 212 to PMA 228 of memory page 114, which is shared between applications 106 and 108. As such, application 106, application 108, and RDMA hardware reference (or point to) memory page 114 for this content.

After updating the mapping in CPU page tables 146, deduplication module 138 may set memory page 114 to a writeable mode. If a memory page is set to the writeable mode, applications may perform write operations on the memory page. In some examples, memory page 114 is set to a copy-on-write mode. If application 106 or application 108 attempts to modify memory page 114 before the re-registration is completed, OS kernel 102 may block the application until memory buffer 112 has been completely re-registered. In an example, OS kernel 102 may suspend the application until memory buffer 112 has been completely re-registered. After the re-registration is completed, a write to the memory page may trigger a copy-on-write and the application is unblocked. If the application writes to the memory page while it is in the copy-on-write mode, the memory page may be copied to the writing application's memory and store the application's updates.

Memory page 112A may be reused for some other purpose. An advantage of an embodiment of the disclosure may provide for improving memory utilization. In an example, memory manager 134 sets memory page 112A's write permission to true in CPU page tables 146 so that the memory page may be used to store other data.

As discussed above and further emphasized here, FIGS. 1, 2, and 3A-3C are merely examples, which should not unduly limit the scope of the claims. For example, although one memory page is illustrated as being de-duplicated, it should be understood that one or more memory pages may be de-duplicated. Further, although memory page 112A and memory page 114 are described as being associated with different applications, it should be understood that these memory pages may be associated with the same application and thus reside in the memory space of the same application.

Additionally, in one illustrative embodiment, as schematically shown in FIG. 1, computing device 101 may execute OS kernel 102 and one or more applications 106, 108.

IV. Example Host Computer System

Figure 4:
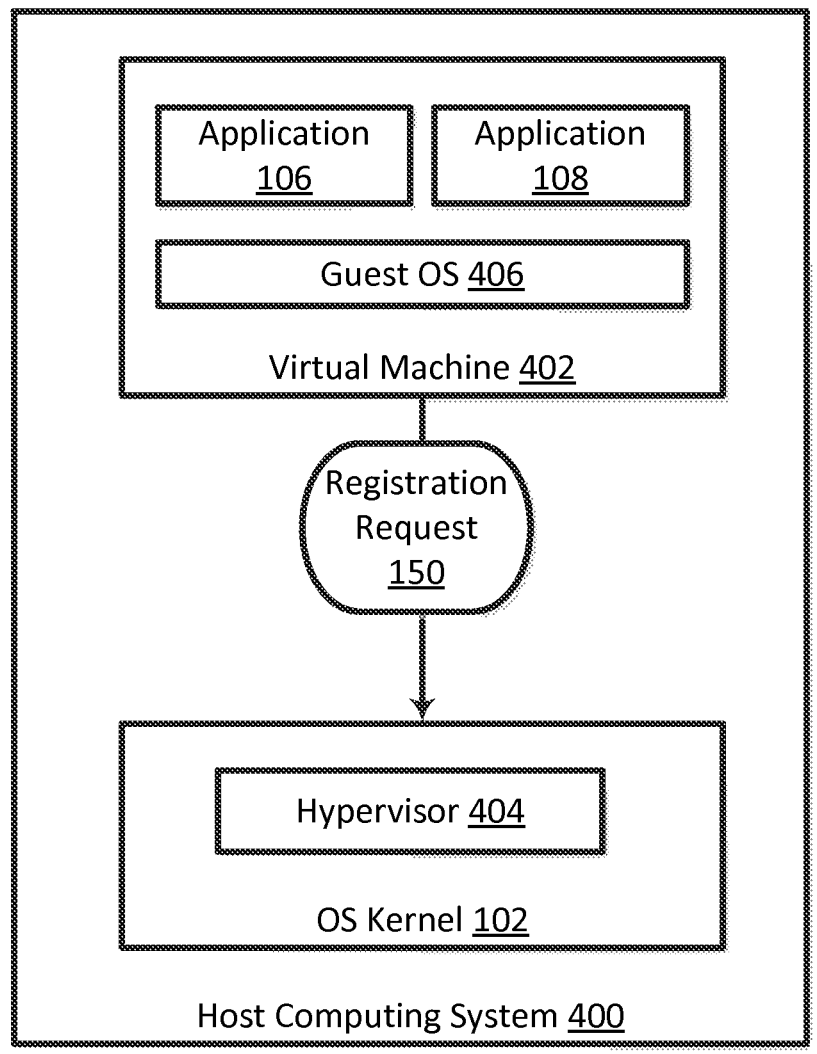
FIG. 4 depicts a system of one illustrative embodiment of a host computing system in accordance with one or more aspects of the present disclosure.

In another illustrative example, as schematically shown in FIG. 4, a host computer system 400 may run one or more virtual machines (VMs) that run applications and services. FIG. 4 depicts a high-level component diagram of one illustrative embodiment of a computing device (e.g., computing device 101) in accordance with one or more aspects of the present disclosure. In FIG. 4, host computer system 400 includes a VM 402, hypervisor 404, and applications 106 and 108. Although one VM is illustrated as running on host computer system 400, other embodiments including more than one VM are within the scope of the present disclosure.

Hypervisor 404 may allow multiple operating systems (OSs), called guests, to run on the same physical system by offering virtualized hardware to the guests. Host computer system 400 may run multiple OSs, concurrently and in isolation from other programs on a single system. A VM may include a guest that executes a device driver (not shown) that communicates with the hardware devices. Host computer system 400 may run multiple virtual machines 402, by executing a software layer, often referred to as hypervisor 404 above the hardware and below the virtual machines. In certain implementations, hypervisor 404 may be a component of OS kernel 102 executed by host computer system 400. Alternatively, hypervisor 404 may be provided by an application running under host OS kernel 102, or may run directly on host computer system 400 without an operating system beneath it.

Hypervisor 404 may abstract the physical layer, including CPUs, memory, and I/O devices, and present this abstraction to virtual machines 402 as virtual devices, including virtual CPUs, virtual memory, and virtual I/O devices. A virtual machine 402 may execute a guest OS 406, which may utilize the underlying virtual devices, each of which may map to a device of host computer system 400 (e.g., a network interface device (not shown), a CD-ROM drive, etc. (not shown)). One or more applications 106, 108 may be running on virtual machine 402 under guest OS 406.

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

In FIG. 4, each virtual machine and/or application running on a virtual machine may be assigned its own virtual memory space and may be considered application 106, as discussed above, and memory manager 134 may maintain a set of CPU page tables for each virtual machine and each application running in the virtual machine. Additionally, RDMA NIC 111 may maintain a set of page tables for each registered memory region, where the set of page tables includes access permissions to the registered memory regions. The above and below descriptions in relation to deduplication of RDMA memory pages associated with the virtual machine or applications running on the virtual machines may apply.

V. Example Method

Figure 5:
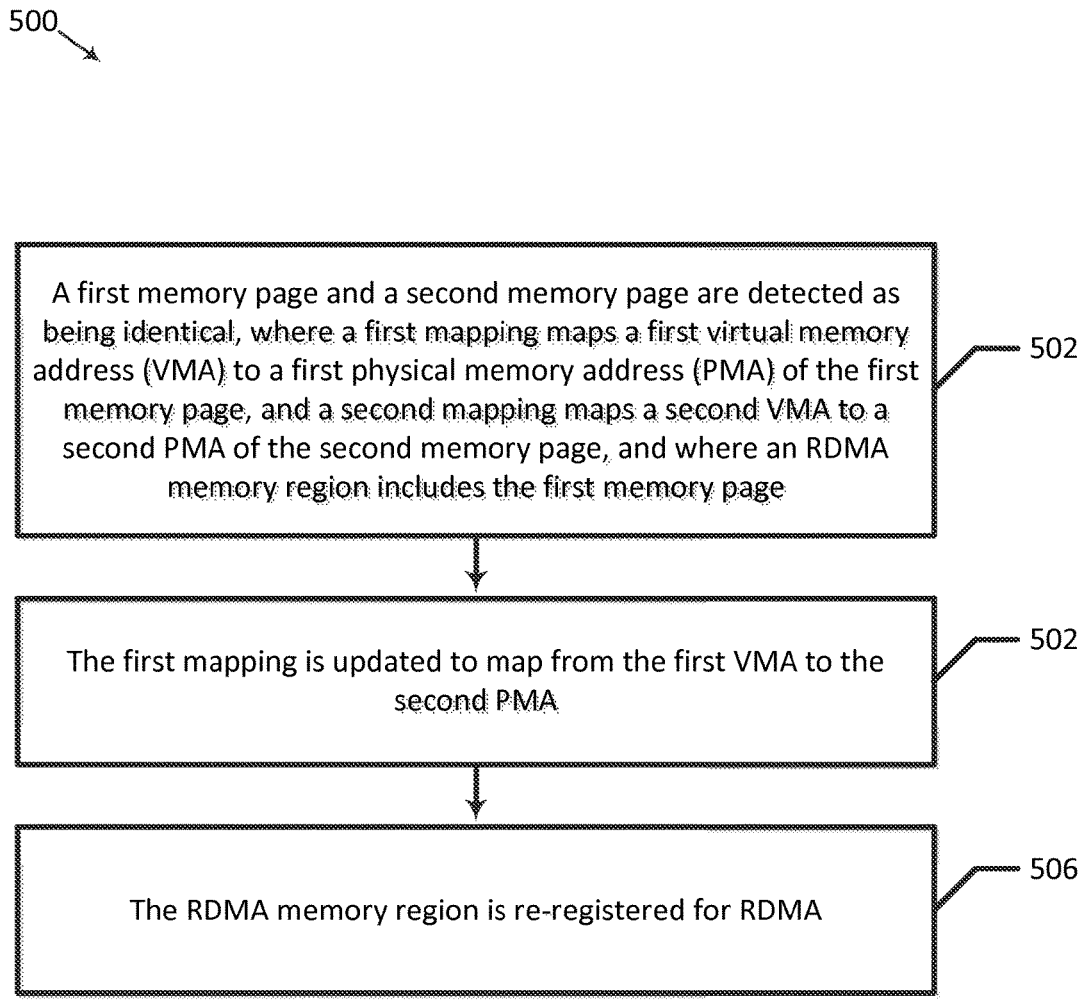
FIG. 5 is a simplified flowchart illustrating a method of providing deduplication support for RDMA in accordance with one or more aspects of the present disclosure.

FIG. 5 is a simplified flowchart illustrating a method 500 of providing deduplication support for RDMA in accordance with one or more aspects of the present disclosure. Method 500 is not meant to be limiting and may be used in other applications.

Method 500 includes blocks 502-506. In a block 502, a first memory page and a second memory page are detected as being identical, where a first mapping maps a first VMA to a PMA of the first memory page, and a second mapping maps a second VMA to a second PMA of the second memory page, and where an RDMA memory region includes the first memory page. In an example, same page managing module 137 detects that memory page 112A and memory page 114 are identical, where mapping 230 maps VMA 212 to a first PMA of the first memory page, and a second mapping maps a second VMA to a second PMA of the second memory page, and wherein an RDMA memory region includes the first memory page.

In a block 504, the first mapping is updated to map from the first VMA to the second PMA. In an example, deduplication module 138 updates the first mapping to map from VMA 212 to PMA 228. In a block 506, after the first mapping is updated, the RDMA memory region is re-registered. In an example, after the first mapping is updated to map from VMA 212 to PMA 228, RDMA core 136 re-registers memory buffer 112.

In some embodiments, one or more actions illustrated in blocks 502-506 may be performed for RDMA memory pages that are de-duplicated. It is also understood that additional processes may be performed before, during, or after blocks 502-506 discussed above. It is also understood that one or more of the blocks of method 500 described herein may be omitted, combined, or performed in a different sequence as desired.

In some examples, after it is determined that the RDMA memory region is set to the read-only permission, blocks 506, 508, and 510 are executed.

VI. Example Computing System

Figure 6:
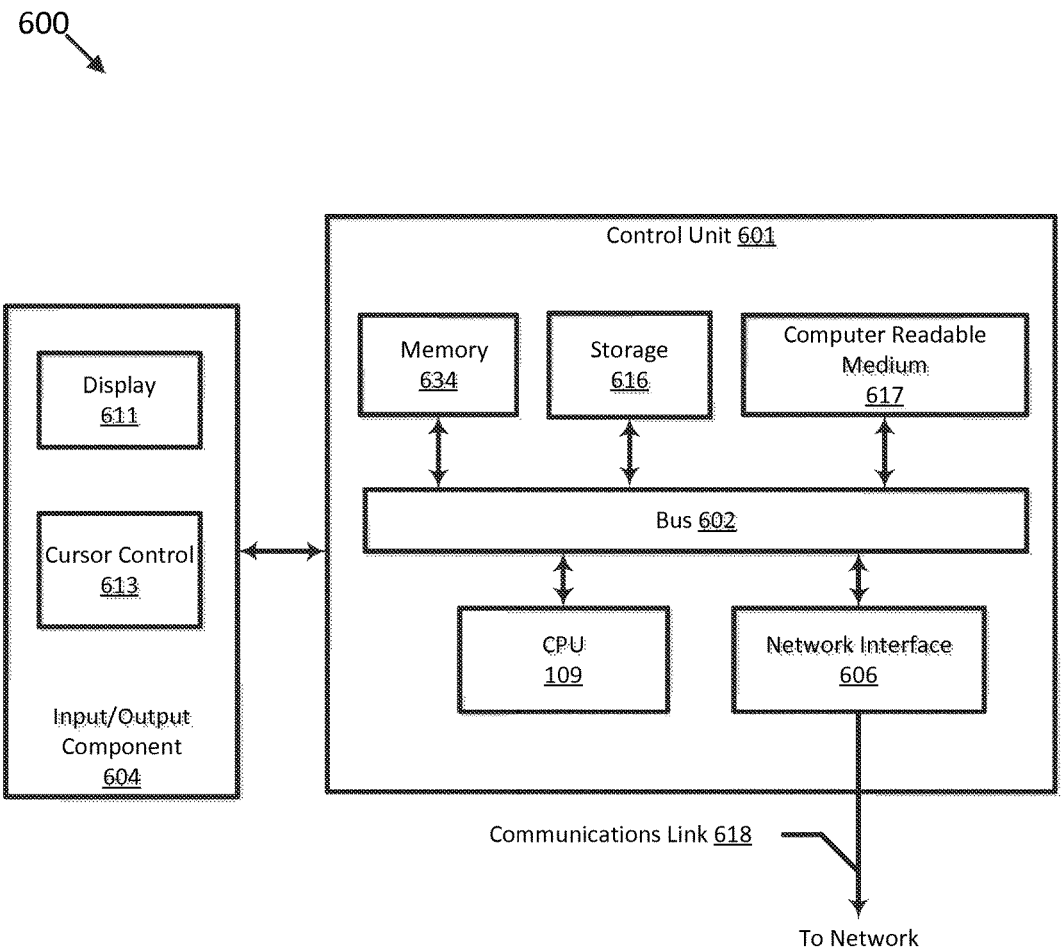
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computer system 600 corresponds to computing device 101, which may include a client or a server computing device. The client or server computing device may include a plurality of CPUs. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a CPU or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/ output (I/O) component 604 that processes a user action, such as selecting keys from a keypad/keyboard, selecting one or more buttons or links, etc., and sends a corresponding signal to bus 602. In an example, a user may interact with host computing system 400 using I/O component 604 and cause application 108 to launch. Hypervisor 404 may share identical memory pages among the different processes and/or virtualized guests. I/O component 604 may also include an output component such as a display 611, and an input control such as a cursor control 613 (such as a keyboard, keypad, mouse, etc.).

A transceiver or network interface 606 transmits and receives signals between computer system 600 and other devices via a communication link 618 to a network. In an embodiment, the transmission is wireless, although other transmission mediums and methods may also be suitable. CPU 109, which may be a micro-controller, digital signal processor (DSP), or other processing component, processes these various signals, such as for display on computer system 600 or transmission to other devices via communication link 618. CPU 109 may also control transmission of information, such as cookies or IP addresses, to other devices.

Components of computer system 600 also include a system memory component 634 (e.g., RAM), a static storage component 616 (e.g., ROM), and/or a disk drive 617. System memory component 634 may include memory 110. Computer system 600 performs specific operations by CPU 109 and other components by executing one or more sequences of instructions contained in system memory component 634. Logic may be encoded in a computer readable medium, which may refer to any medium that participates in providing instructions to CPU 109 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of providing deduplication support for remote direct memory access (RDMA) memory, comprising:
    detecting that a first memory page and a second memory page are identical, wherein a first mapping maps a first virtual memory address (VMA) to a first physical memory address (PMA) of the first memory page, and a second mapping maps a second VMA to a second PMA of the second memory page, wherein the first VMA is part of a first application's virtual memory space, and the second VMA is part of a second application's virtual memory space, and wherein an RDMA memory region including the first memory page has been registered for RDMA and includes a list of memory pages associated with the first application's virtual memory space;
    updating the first mapping to map from the first VMA to the second PMA after detecting that the first memory page and the second memory page are identical; and
    re-registering the RDMA memory region for RDMA after updating the first mapping.

2. The method of claim 1, further comprising:
    determining that the RDMA memory region is set to a read-only permission, wherein the updating and re-registering occur after the RDMA memory region is determined to be set to the read-only permission.

3. The method of claim 1, further comprising:
    write-protecting at least one of the first mapping or the second mapping before re-registering the RDMA memory region.

4. The method of claim 1, wherein the list of memory pages specifies physical memory pages included in the RDMA memory region.

5. The method of claim 4, wherein re-registering the RDMA memory region includes updating the list of physical memory pages by replacing the first memory page specified in the list with the second memory page.

6. The method of claim 1, further comprising:
registering the list of memory pages for RDMA, wherein registering includes pinning the list of memory pages; and
un-pinning the first memory page after re-registering the RDMA memory region, wherein re-registering the RDMA memory region includes pinning the second memory page.

7. The method of claim 1, further comprising:
after updating the first mapping, setting the first memory page to a writeable mode.

8. The method of claim 1, further comprising:
reading a flag that indicates whether to send a notification that the first memory page is de-duplicated; and
sending, based on a value of the flag, the notification if the first memory page is de-duplicated.

9. A system for providing deduplication support for remote direct memory access (RDMA) memory, comprising:
an RDMA memory region that includes a first memory page;
a same page managing module that detects that the first memory page and a second memory page are identical, wherein a first mapping maps a first virtual memory address (VMA) to a first physical memory address (PMA) of the first memory page, and a second mapping maps a second VMA to a second PMA of the second memory page, wherein the first VMA is part of a first application's virtual memory space, and the second VMA is part of a second application's virtual memory space, and wherein an RDMA memory region including the first memory page has been registered for RDMA and includes a list of memory pages associated with the first application's virtual memory space;
a deduplication module that updates the first mapping to map from the first VMA to the second PMA after the same page managing module detects that the first memory page and the second memory page are identical; and
an RDMA core that re-registers the RDMA memory region for RDMA after the deduplication module updates the first mapping.

10. The system of claim 9, wherein a second RDMA memory region includes the second memory page, and the second memory region is set to the read-only permission.

11. The system of claim 9, wherein the second memory page is not registered for RDMA.

12. The system of claim 9, wherein the RDMA core receives a request to register a memory region for RDMA, and the request is from the first application associated with the first memory page, and wherein the RDMA core registers the memory region to produce the RDMA memory region.

13. The system of claim 9, wherein the first application is a guest operating system.

14. The system of claim 9, further comprising:
a second memory that stores a page table for the first application, wherein the page table includes the first mapping.

15. The system of claim 9, wherein the RDMA core sets the first memory page to a writeable mode after the RDMA memory region is re-registered.

16. The system of claim 9, wherein the first memory page is unpinned and the second memory page is pinned after the RDMA memory region is re-registered.

17. The system of claim 9, wherein the deduplication module determines that the RDMA memory region is set to a read-only permission, and wherein the update to the first mapping and the re-registration of the RDMA memory region occur after the RDMA memory region is determined to be set to the read-only permission.

18. The system of claim 9, wherein the deduplication module sets the first mapping to the read-only permission before re-registering the RDMA memory region and sets the second mapping to the read-only permission before re-registering the RDMA memory region.

19. A non-transitory machine-readable medium comprising a plurality of machine-readable instructions that when executed by one or more processors is adapted to cause the one or more processors to perform a method comprising:
detecting that a first memory page and a second memory page are identical, wherein a first mapping maps a first virtual memory address (VMA) to a first physical memory address (PMA) of the first memory page, and a second mapping maps a second VMA to a second PMA of the second memory page, wherein the first VMA is part of a first application's virtual memory space, and the second VMA is part of a second application's virtual memory space, and wherein an RDMA memory region including the first memory page has been registered for RDM A and includes a list of memory pages associated with the first application's virtual memory space;
updating the first mapping to map from the first VMA to the second PMA after detecting that the first memory page and the second memory page are identical; and
re-registering the RDMA memory region for RDM A after updating the first mapping.

20. The system of claim 1, wherein after re-registering the RDMA memory region for RDMA, the RDMA memory region includes the second memory page and does not include the first memory page.

* * * * *